(12) United States Patent
Houvener

(10) Patent No.: US 6,424,249 B1
(45) Date of Patent: *Jul. 23, 2002

(54) POSITIVE IDENTITY VERIFICATION SYSTEM AND METHOD INCLUDING BIOMETRIC USER AUTHENTICATION

(75) Inventor: Robert C. Houvener, Nashua, NH (US)

(73) Assignee: Image Data, LLC, Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/249,277

(22) Filed: Feb. 11, 1999

Related U.S. Application Data

(63) Continuation-in-part of application No. 08/966,520, filed on Nov. 10, 1997, now Pat. No. 6,040,783, which is a continuation-in-part of application No. 08/684,677, filed on Jul. 19, 1996, now Pat. No. 5,790,674, which is a continuation-in-part of application No. 08/436,146, filed on May 8, 1995, now Pat. No. 5,657,389.

(51) Int. Cl.$^7$ ............................................. H04Q 19/00
(52) U.S. Cl. ....................... 340/5.82; 340/5.8; 340/5.83; 340/5.84
(58) Field of Search ................................ 340/5.8, 5.81, 340/5.82, 5.83, 5.84

(56) References Cited

U.S. PATENT DOCUMENTS

| | | | |
|---|---|---|---|
| 4,023,013 A | 5/1977 | Kinker | 235/61.7 |
| 4,636,622 A | 1/1987 | Clark | 235/380 |
| 4,790,564 A | 12/1988 | Larcher et al. | 283/69 |
| 4,947,442 A | 8/1990 | Tanaka et al. | 382/5 |
| 4,995,086 A | 2/1991 | Lilley et al. | 382/4 |
| 5,056,141 A | 10/1991 | Dyke | 380/25 |
| 5,180,901 A | 1/1993 | Hiramatsu | 235/380 |
| 5,305,196 A | 4/1994 | Deaton et al. | 364/401 |
| 5,367,572 A | 11/1994 | Weiss | 380/23 |
| 5,416,306 A * | 5/1995 | Imahata | 235/380 |
| 5,457,747 A * | 10/1995 | Drexler et al. | 380/24 |
| 5,469,506 A * | 11/1995 | Berson et al. | 380/23 |
| 5,485,312 A | 1/1996 | Horner et al. | 359/561 |
| 5,493,621 A | 2/1996 | Matsumura | 382/125 |
| 5,509,083 A * | 4/1996 | Abtahi et al. | 382/124 |
| 5,513,272 A | 4/1996 | Bogosian, Jr. | 382/116 |
| 5,613,014 A | 3/1997 | Eshera et al. | 382/124 |
| 5,623,552 A | 4/1997 | Lane | 382/124 |
| 5,633,947 A | 5/1997 | Sibbald | 382/124 |
| 5,648,648 A | 7/1997 | Chou et al. | 235/382 |
| 5,701,770 A | 12/1997 | Cook et al. | 70/63 |
| 5,764,789 A | 6/1998 | Pare, Jr. et al. | 382/115 |
| 5,790,674 A | 8/1998 | Houvener et al. | 380/23 |
| 5,799,098 A | 8/1998 | Ort et al. | 382/125 |
| 5,815,252 A | 9/1998 | Price-Francis | 356/71 |
| 5,825,005 A | 10/1998 | Behnke | 235/380 |
| 5,832,464 A | 11/1998 | Houvener et al. | 705/45 |
| 5,903,225 A | 5/1999 | Schmitt et al. | 340/825.31 |
| 5,965,859 A | 10/1999 | DiVincenzo et al. | 235/380 |

FOREIGN PATENT DOCUMENTS

| WO | WO 9832093 | 7/1998 | G06K/9/00 |
|---|---|---|---|

* cited by examiner

*Primary Examiner*—Michael Horabik
*Assistant Examiner*—Matsuichiro Shimizu
(74) *Attorney, Agent, or Firm*—Bourque & Associates, PA

(57) ABSTRACT

A system and method of providing system integrity and audit capabilities to a positive identification system is disclosed. In the preferred embodiment, the system uses biometric access authority information units and a biometric comparison system at a remote database site to permit authorized system users to access the positive identification system. The system also utilizes secondary access authority information units to permit authorized system users to access the system in the event that one or more authorized system users cannot be authenticated using the biometric comparison system.

17 Claims, 6 Drawing Sheets

POSITIVE IDENTITY VERIFICATION SYSTEM AND METHOD INCLUDING BIOMETRIC USER AUTHENTICATION

RELATED APPLICATION

This is a Continuation-in-part of application Ser. No. 08/966,520 filed Nov. 10, 1997 now U.S. Pat. No. 6,040,783, which is a Continuation-in-part of application Ser. No. 08/684,677, filed Jul. 19, 1996, now U.S. Pat. No. 5,790,674, which is a Continuation-in-part of application Ser. No. 08/436,146, filed May 8, 1995, now U.S. Pat. No. 5,657,389.

FIELD OF THE INVENTION

The present invention relates to the field of identity verification. Specifically, the invention is directed to a system and method of providing system integrity and audit capabilities to a positive identification system by including biometric user authentication. More particularly, the system and the method utilizes an automated biometric comparison system to limit access to the identification database and the information contained therein to personnel who are authorized to do so. Useful biometrics include fingerprints, retinal scans as well as thermal images and voiceprints. However, due to the unavailability of low-cost biometric comparison technology that can readily identify the required percentage of system users, the disclosed system includes a personal identification number (PIN) back-up user authentication system and method.

BACKGROUND OF THE INVENTION

Positive identity verification is critical in many type of transaction and security applications. For example, signatures, fingerprints or images of faces are compared to establish or verify the identity of an individual. Creation of fraudulent identities or the misrepresentation of an individual's identity can result in fraudulent transactions and the breach of security systems. At present, such positive identification means as driver's licenses, picture identification cards, hand-written signatures, personal identification numbers, fingerprints, retinal scans, voice prints and other ways of uniquely identifying personal characteristics are used. However, these prior art methods of identity verification exhibit one or more of the following deficiencies: 1) they do not offer sufficient reliability for most positive personal identification applications; 2) the technology required for their implementation is too expensive for wholesale adoption by entire industries; 3) they do not offer ease of use, which is critical for most applications of personal identification; 4) the technology required to implement them in a wide-scale manner is not yet mature enough to guarantee sufficient reliability; 5) the recurring cost of using technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; and 8) the process of verification does not include sufficient steps to ensure that the individual responsible for identity verification is accountable to ensure that identity verification is accurately performed.

One system which relies on positive identity verification for transaction is the credit/debit and charge card system. Credit cards are an increasingly popular means for consumers to complete transactions. However, part of the costs incurred for the convenience of using credit cards is the burgeoning growth of credit card fraud. Because there are trillions of dollars of credit card transactions made each year, which depend on the fact that the person presenting the form of payment is actually the person having the legal right to use the underlying account, even a small percentage of fraudulent transactions results in billions of lost dollars. The cost of this fraud is paid for, indirectly, by consumers in the form of higher credit card interest rates and fees and, in part, by merchants accepting such credit cards in the form of higher transaction commissions.

Methods used to combat fraud have been the use of holographic images on cards, the need for a validation requester to obtain transaction approval, the encoding of cardholder information on magnetic strips on the back of the card, as well as signature verification. However, one of the underlying deficiencies of the prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In recent past, Citibank introduces a credit card with a digital likeness of the authorized user provided on the card itself. The photographic image on the Citibank card resulted in an initial drop in fraud in the New York test market estimated as high as 67 percent. However, the Citibank photo card system, like other forms of identity verification that are distributed to the public, will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit card manufacturing equipment must be accomplished.

The disclosed invention offers a number of advances over prior art identity verification systems and methods, which overcome many of the limitations found in such prior art systems. The first, and perhaps the most significant, advantage of the disclosed invention is that the positive identification system stores the verification data at a remote site and thereby does not give criminals access to the identity verification medium. This is significant in that any time a potential counterfeiter is afforded the opportunity to access the verification medium, there is the potential that the medium can be corrupted, regardless of the level of security sophistication incorporated into the system.

A second, and again significant, advantage of the disclosed invention is that the system is completely independent of the users the system is designed to positively identify. For example, the system is independent of credit cards account numbers, checking account number and the like. Thus, for example, the disclosed invention does not require the modification or replacement of existing credit cards, which would be an almost insurmountable task. Furthermore, the segregation of the identity verification medium from the users themselves allows the system disclosed herein to be used in conjunction with any number of credit card accounts, checking accounts or other applications where it is critical to determine that a person is who he or she purports him or herself to be.

SUMMARY OF THE INVENTION

The present invention is a system and method of providing access integrity and audit capabilities to a positive identification system by including biometric user authentication in the system and method. The system comprises a point of identification terminal having a means for inputting a biometric access authority information unit from a system user, a means for inputting identifying information presented by a particular individual, at least one database storage and retrieval site having stored therein a plurality of digital image data unique to persons to be identified and a biometric access authority information unit database, including biometric data associated with authorized system users. The system also comprises a means for exchanging biometric, identifying and other data between the point of identification terminal and the database site. In addition to authenticating system users, the database site also includes a means of validating that a point of identification terminal seeking to exchange data with the site is authorized to do so.

When a query is initiated from a point of identification terminal, the system user must input a biometric access authority information unit associated with that user into the point of identification terminal. In one preferred embodiment, the biometric access authority information unit comprises one or more of the system user's fingerprints, which are read by a fingerprint scanner included in or connected to the point of identification terminal. The input biometric access authority information unit is then transmitted to the remote database site.

At the database site, the system receives the biometric access authority information unit and searches the biometric access authority information unit database to determine if a match exists between the received biometric access authority information unit and a stored biometric access authority information unit. If a match exists, then the system user is permitted to input information presented by a person to be identified at the point of identification terminal into the system.

The point of identification terminal then transmits the information presented at the point of identification terminal to the remote database site, where the system searches the database of digital photographic images of persons to be identified and retrieves any photographic information associated with the identifying information transmitted to the remote database site. The retrieved information is returned to the point of identification terminal where it is displayed on a display device.

Finally, the system incorporates a means for verifying that system user has adequately verified that the digital image displayed on the display device matches physical, biometric information provided by the person to be identified at the point of identification terminal.

DESCRIPTION OF THE DRAWINGS

These and other features and advantages of the present invention will be better understood by reading the following detailed description, taken together with the drawings wherein:

FIG. 2 is a perspective view of the preferred embodiment of the point of identification terminal, which would be available for use at a point of sale or the like;

DETAILED DESCRIPTION OF THE PREFERRED EMBODIMENT

Figure 1:
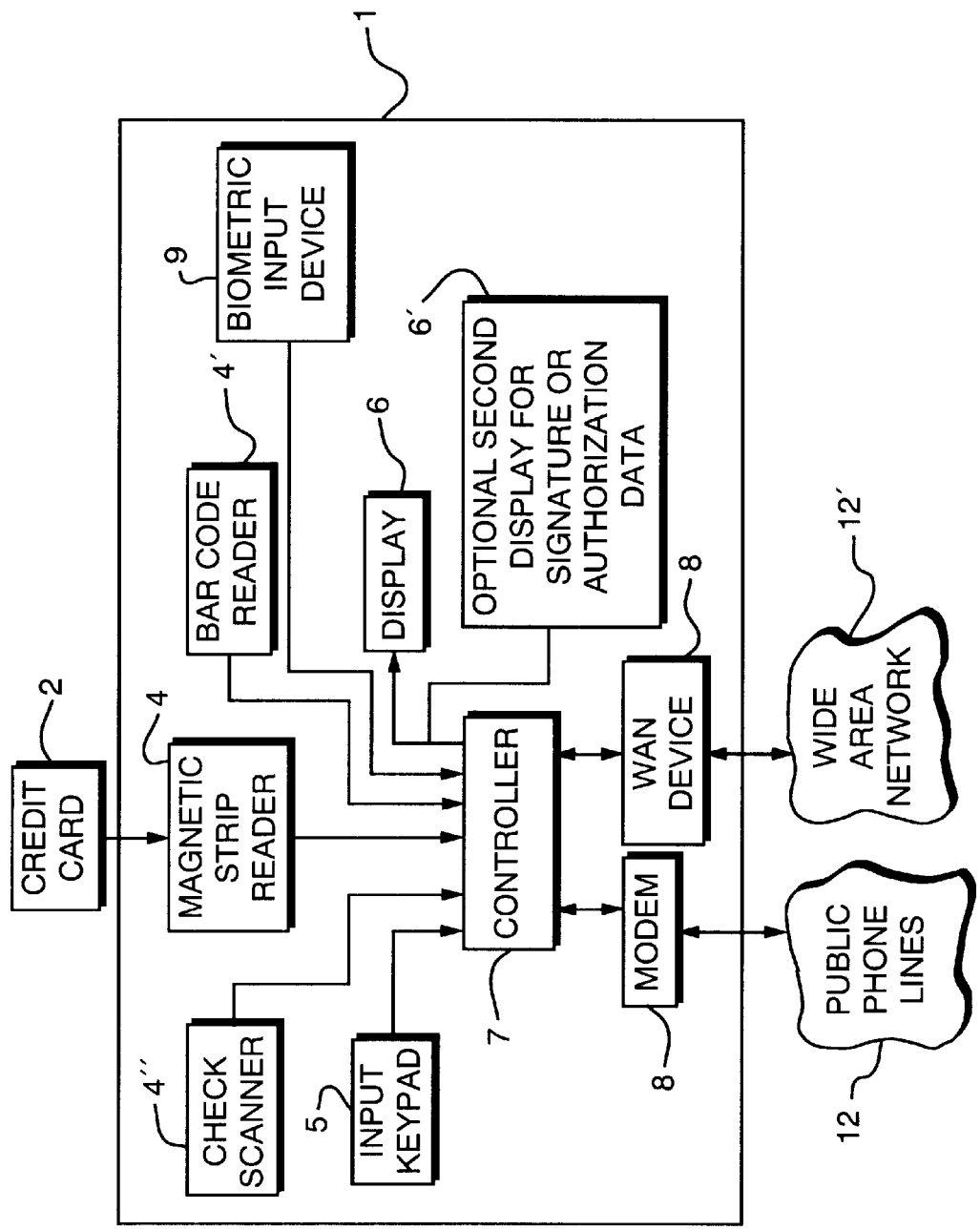
FIG. 1 is a block diagram of a point of identification terminal showing the various components contained therein.
Figure 2:
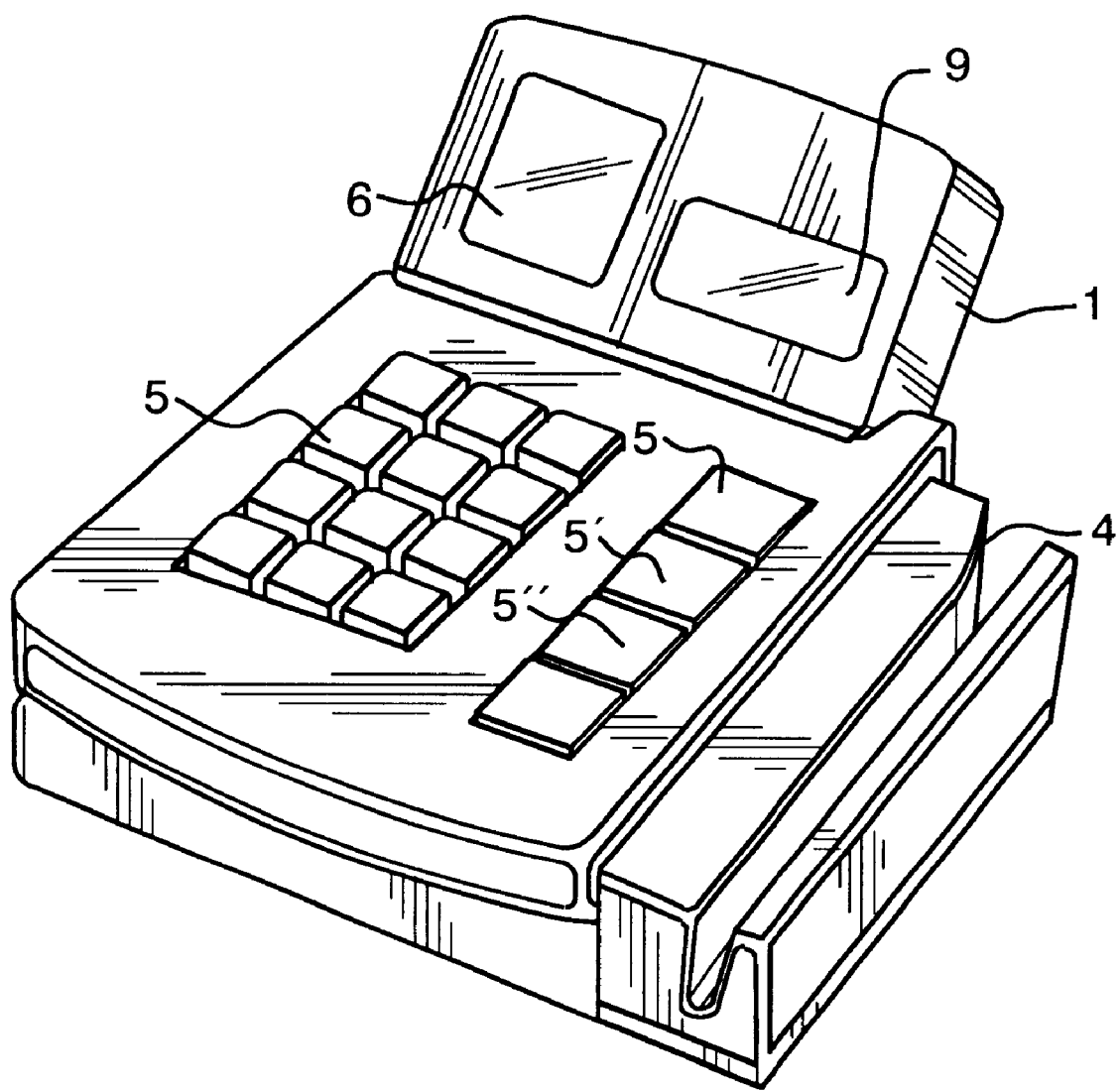
Figure 3:
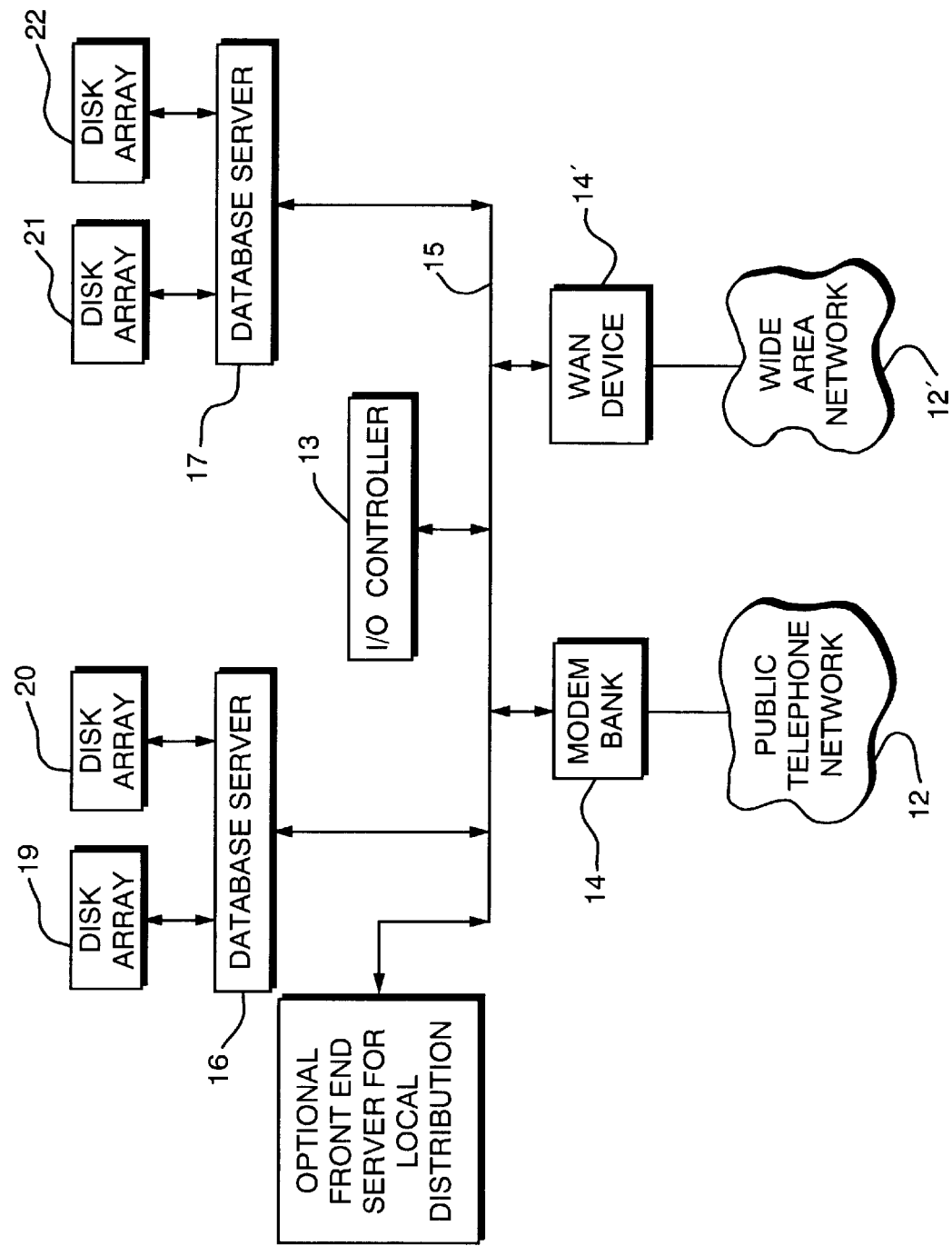
FIG. 3 is a block diagram of components of a positive identification system and the communication flowpath established between the point of identity verification and the remote database storage and retrieval center, which is where a comprehensive database of photographic images of persons to be identified is maintained and accessed for transmission to the point of identification.

The present invention provides a system and method to develop, maintain and use a secure and authentic database of digital photographic images or other biometric data, such as fingerprints, retinal scans, voiceprints and the like including derivatives thereof, as well as well as signatures or other data unique to individuals for positive identification purposes. The system includes a means for authenticating the identity of system users, a means for accessing the database in a secure and cost-effective manner, a means for performing positive identity verification, and a distributed database update and retrieval system, which allows for low cost operation, ease of use, stability and robustness for vast numbers of verification requests originating from worldwide locations. The present invention also includes a means that allows for accountability on the part of system users to ensure that the system is used to its fullest potential.

The system will first be disclosed herein with particular reference to a point of sale system, where a credit card is presented by a consumer, or presenter, in order to make a purchase. Thus, the disclosure will make particular references to credit card account numbers, and the like. However, it is understood that the positive identification system disclosed herein is adaptable to any application where positive identity verification of a person is required. Such alternative applications comprise checking and banking transactions, firearms sales, food stamp reimbursement and a host of other applications related to the welfare, voting, law enforcement, health care, airline, and immigration and naturalization fields. Referring now to the figures, a positive identification system in accordance with the disclosed invention is shown. A point of identification terminal 1 is located at a location where the identity of persons present is required to be verified. The point of identification terminal comprises a standard magnetic strip reader 4, an optional bar code reader 4', a check scanner 4" (all of which are well known in the art), an optional input 5 (which may be a numeric keypad, an alpha-numeric keypad or simply a series of a few dedicated keys), a display means 6, which is preferably a miniature flat panel display, a controller 7, and an internal communication modem or other communication means 8. Also included, as either an integral component of the point of identification terminal or as a separate component, is a biometric input device 9. In one preferred embodiment, the biometric input device comprises a fingerprint scanner for scanning fingerprints of system users to authenticate their authority to access and use the system. However, other biometric input devices, configured to read other biometric data, such as retinal scans, voiceprints, thermal images and the like may work equally well and are envisioned within the scope of the present invention.

One fingerprint scanner, which was recently announced by Siemens Semiconductors, comprises a single-chip fingerprint scanner/digitizer, known as the FingerTIP™. This new fingerprint scanner technology incorporates both a sensor and a digitizer on a single chip, which can readily read fingerprints and convert the same to a digital image capable of being transmitted by the positive identification system over the communications means.

Although the rate of data exchange may vary depending on the availability of quality phone lines or other means of data transmission, such as a dedicated wide area network or a satellite communication link, the system would preferably transmit data at a rate of at least 9,600 baud per second (bps). However, quality data transmission media will allow for the data exchange at rates of 14,400 bps, 28,800 bps or even higher baud rates.

In credit card transactional situation, the point of identification would be the point of sale, which typically incorporates a cash register and prior art credit card verification systems. Upon presentation of a standard credit card 2, the store clerk or other individual responsible for positive identification would input the credit card account number into the point of identification terminal 1. The preferred method of inputting the credit card information would be by swiping the credit card through the standard magnetic strip reader 4. The magnetic strip reader 4 would read credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed characters, and input the credit card account number into the point of identification terminal using keypad 5. Another alternate means of inputting the credit card account information into the point of verification terminal would be to utilize a coded medium such as a bar code. In this embodiment, the magnetic strip reader 4 would be replaced by a standard bar code reader to transfer its data to the code reader 4' and onto controller 7.

Another embodiment of the invention would include check scanner 4", which would be used to scan checking account number information off a standard personal or company check, which would expand the role of the system from credit/debit card transaction identity verification to checking related transactions as well. Of course, additional embodiments would incorporate means of accepting any type of information that would be capable of being used for identification purposes, such as driver's license numbers, social security numbers or the like.

Either before, during or immediately after inputting the credit card account number into the point of identification terminal, the system user would input his or her biometric access authority information unit into the terminal as well. The system may also require the system user to enter a system user ID, which will aid the system in performing a subsequent biometric comparison. (As will be discussed below, the system user may, alternatively input his or her secondary access information unit in lieu of a biometric access authority information unit.)

In the embodiment of FIG. 1, the biometric access authority information units used to authenticate system users comprise fingerprints of authorized system users. Thus, the embodiment of FIG. 1 utilizes a fingerprint scanner as the biometric input device to scan an image of one or more fingerprints of the system user performing the identification transaction. The scanned fingerprint image would then be digitized for transmission to the remote database site. The system may also prepare a derivative of the fingerprint or other biometric access authority information unit and transmit the derivative to the remote database site.

In addition to the credit card account information, the system user could manually input any other information needed to aide in the identity verification process via keypad 5. Such additional information could be whether the presenter is male or female, in which case the keypad could incorporate a specific key to correspond to the male—female choice 5' or whether the presenter is a dependent of the credit card owner, in which case the keypad would incorporate a specific key 5" to correspond to dependent choice.

Figure 4:
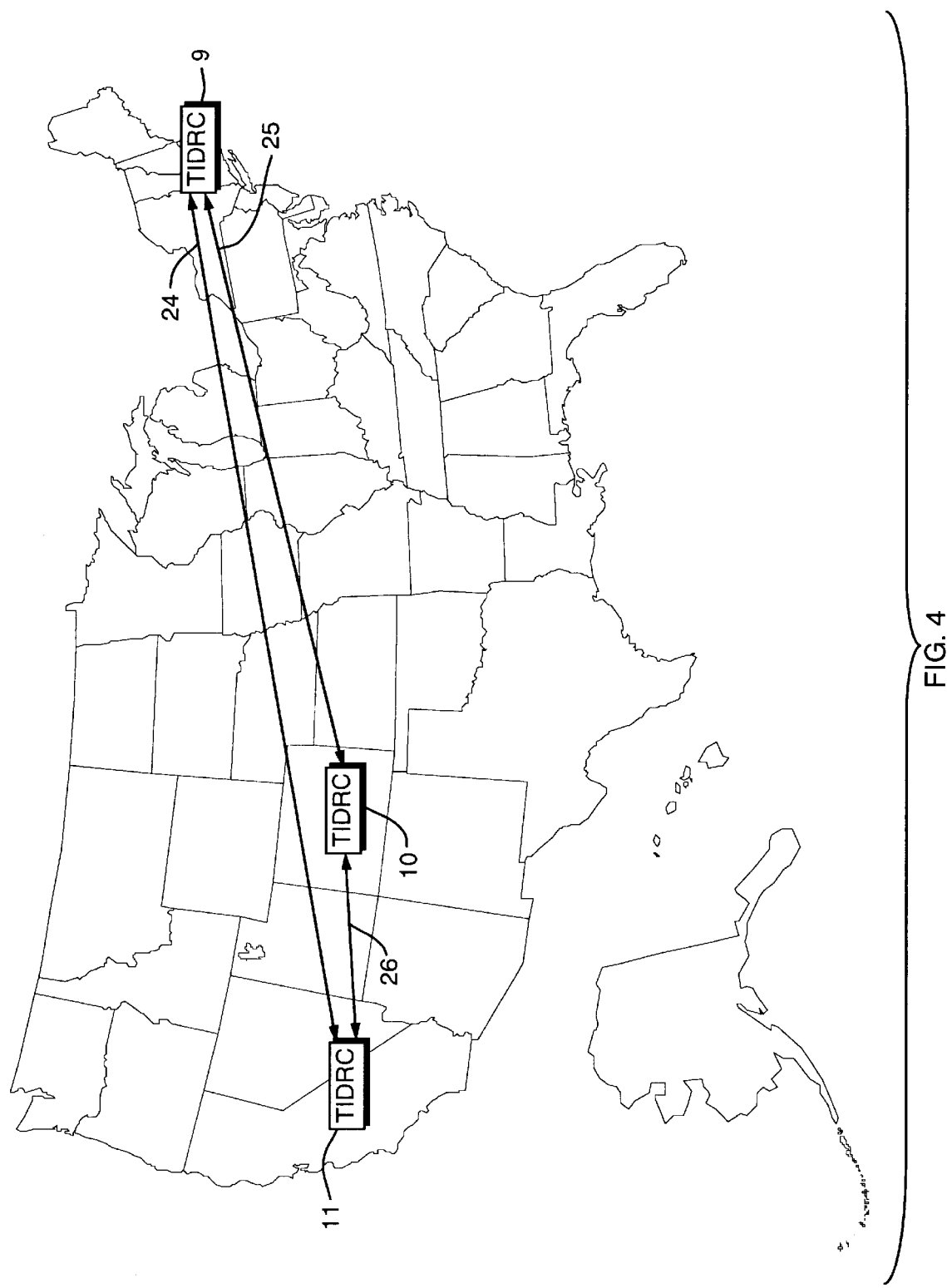
FIG. 4 is an upper level system architecture drawing showing a number of database storage and retrieval centers networked over a global high speed network.

Once the system user's biometric access authority information unit, the account number and the system user's ID number are entered into the point of identification terminal 1, the terminal initiates communications via its internal communication means 8, which could be a modem, wide area network (WAN) device or in the case of a wireless mobile identity verification terminal, a wireless communications transceiver to one of a number of remote database storage sites 9–11 (FIG. 4). Acceptable forms of communications links include public phone lines 12, wide area networks 12', or even satellite or other wireless communications media such as analog or digital cellular telephone systems (not shown). The actual site accessed would be a function of availability and loading on the public access phone lines, network availability, retrieval site availability or other system availability criteria at the time the terminal initiates communication with a remote database site.

Communications will then be established with an input/output controller 13 at the remote database storage site through a modem bank 14 at the database storage site, the controller 13 would initiate a query to the point of identification terminal 3 to verify that the terminal has the appropriate authority to access the remote database site and is a valid device. One simple and cost effective method of performing this query is to use commonly available caller ID technology to ensure that the request for data has originated from an authorized telephone line. Additionally, a software key may be incorporated into each point of identification terminal which will respond in a predetermined manner when queried by a remote database storage site.

Once controller 13 verifies that the requesting point of identification terminal 1 is a valid device and has the appropriate access privilege, the next step would be to authenticate the system user initiating the transaction to ensure that the system user is authorized to access the system. This is accomplished by transmitting the system user's biometric access authority information unit or a derivative thereof to the remote database site via the communications link.

Once the biometric access authority information unit or derivative and a system user ID are received at the remote database site, the system searches a database of valid access authority information units, such as a fingerprint image database, and retrieves a stored biometric unit associated with the system user ID. The system then compares the stored biometric unit with the biometric unit transmitted to the remote database site to determine if a match exists.

In a more sophisticated embodiment, since the system would be utilized in connection with a relatively limited number of authorized system users when compared to the extremely large numbers of individuals the positive identification system is designed to identify, a fingerprint verification system that does not require the transmission of a system user ID may provide an acceptable biometric comparison system. However, as can be appreciated, a system that requires a search and comparison of a transmitted image to hundreds or thousands of stored images will necessarily be slower than a system that performs a one-to-one comparison. In any event, with the increasing sophistication of computer hardware and software and the availability of ultra-high speed processors, it is envisioned that acceptable speeds may be achievable.

However, with currently available, cost-effective fingerprint comparison technologies and cost-effective hardware and software, the one-to-one comparison system proves to be especially useable. Nevertheless, there exists the potential that some of the authorized system users may not have fingerprints or other biometrics that are acceptable to the system. Thus, the system would incorporate a secondary means of authenticating system users.

The secondary method of user authentication includes a plurality of secondary access authority information units that are maintained in a secondary access authority information unit database at the one or more remote database sites where the biometric access authority information unit and the digital photographic image databases are maintained. In lieu of a biometric access authority information unit, the secondary or backup method would require the input of a secondary access authority information unit at the point of identification terminal and the transmission of the input unit to the remote database site where it will be compared to a plurality of secondary access authority information units maintained in a secondary access authority information unit database to determine if the input unit matches a stored unit associated with an authorized system user.

As is more fully disclosed in commonly owned, co-pending U.S. application Ser. No. 08/966,520, which is fully incorporated herein by reference, in one embodiment, the system utilizes a plurality of unique, memorized personal identification numbers (PINs) as the secondary access authority information units. Each system user who does not have an acceptable biometric access authority information unit is assigned a unique PIN, which he or she must memorize. Each memorized PIN would then be mapped by the positive identification system to a single user in the secondary access authority information unit database located at the remote database site.

A more robust implementation of a PIN-based secondary access authority information unit system includes the implementation of the secondary access authority information unit as a unique PIN, which is implemented as a portable storage device or electronic key. The electronic key is embedded with a readable code that is associated with a specific authorized system. The readable code embodied in the key is mapped to its associated user in the remote database. (Optionally, each user can be assigned a unique PIN to memorize as well, which would provide a redundant method of ensuring access to the remote database is only granted to authorized individuals.)

In either the biometric access authority information unit embodiment or the embodiment that utilizes a secondary access authority information unit to authenticate a system user, once the system determines that an input access authority information unit or a derivative thereof matches an access authority information unit maintained in the access authority information unit database, the system user will be authenticated and he or she will be permitted to complete an identification transaction. If either or both of the access authority information units does not match, then access to the identification database will be denied.

Figure 5:
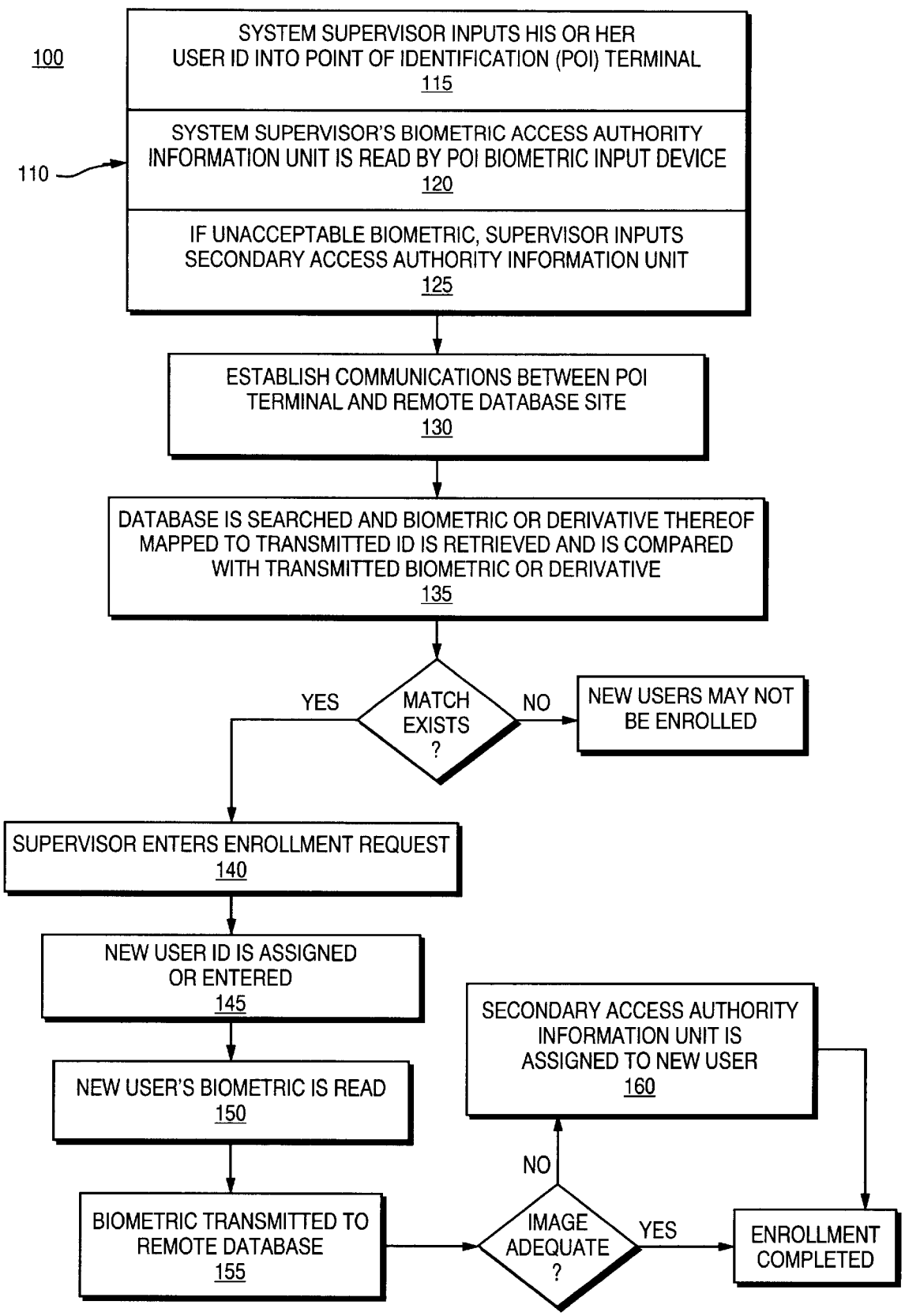
FIG. 5 is a block diagram showing a method for enrolling system users by obtaining biometric information from said authorized system users to provide audit capabilities and system integrity to a positive identification system.

FIG. 5 discloses one embodiment of a user enrollment method, which utilizes the same hardware that is utilized to authenticate system users during subsequent identification transactions to enroll authorized system users. The method of enrolling authorized system users 100 relies upon a system supervisor whose identity has been previously authenticated using a similar method at some point in the past.

As will become more evident below, the method begins by re-authenticating the system supervisor 110. The re-authentication process includes requiring the system supervisor to input his or her system user ID number into the point of identification terminal, step 115 and have his or her biometric access authority information unit, such as his or her fingerprint, read by the terminal's biometric input device 9 (FIG. 1), step 120.

Alternatively, if a specific system supervisor does not have an acceptable biometric access authority information unit, he or she will utilize a secondary access authority information unit, such as a memorized or token-implemented PIN, as discussed above, step 125. The system then establishes communications with one or more remote database site in a manner similar to that described earlier with respect to the method of identifying individuals, step 130.

Once communications with the remote database are established and the terminal is authenticated as discussed above, the system then searches a database of access authority information units, and, in this case a database of digital images of fingerprints of authorized system users to determine if a match exists between the supervisor's fingerprint image as read at the point of identification terminal and the fingerprint image mapped to the received system user ID number, step 135. If a match exists, which indicates that the system supervisor is authorized to access the system, then the remote database site will allow new system users to be enrolled.

If a new system user is being enrolled, the supervisor will initiate an enrollment request, step 140, via the point of identification terminal keypad 5 (FIG. 1). The system will then either prompt the system user being enrolled to input a system user ID number or assign a system user ID number to the system user being enrolled, step 145. For example, a new system user may want to utilize an ID number that will be easy to remember. However, it is important that each system user has a unique system user ID number.

Since system users will be mapped to specific sites having specific point of identification terminals, the system can use a combination of terminal ID and system user ID to ensure that a transmitted system user ID belongs to a specified user. In this manner, if an authorized system user attempts to input his or her user ID number from a point of identification terminal other than those for which his or her use is authorized, then access to the database will be immediately denied and the access attempt can be recorded for follow-up by security personnel if appropriate.

Once the system user ID is input or assigned, the system reads a biometric belonging to the system user, such one or more of his or her fingerprints, step 150. The biometric is then transmitted to the remote database site, step 155, where it is read and analyzed to determine if it is an adequate image for future system user authentication purposes. If an adequate image is not received, the system may request additional fingerprint or other biometrics. However, after a set number of attempts, the system will determine that the system user does not have an acceptable biometric, in which case the system will instruct the supervisor to assign a secondary access authority information unit, such as a memorized PIN or an electronic token-implemented PIN to the system user for future system user authentication purposes, step 160.

Figure 6:
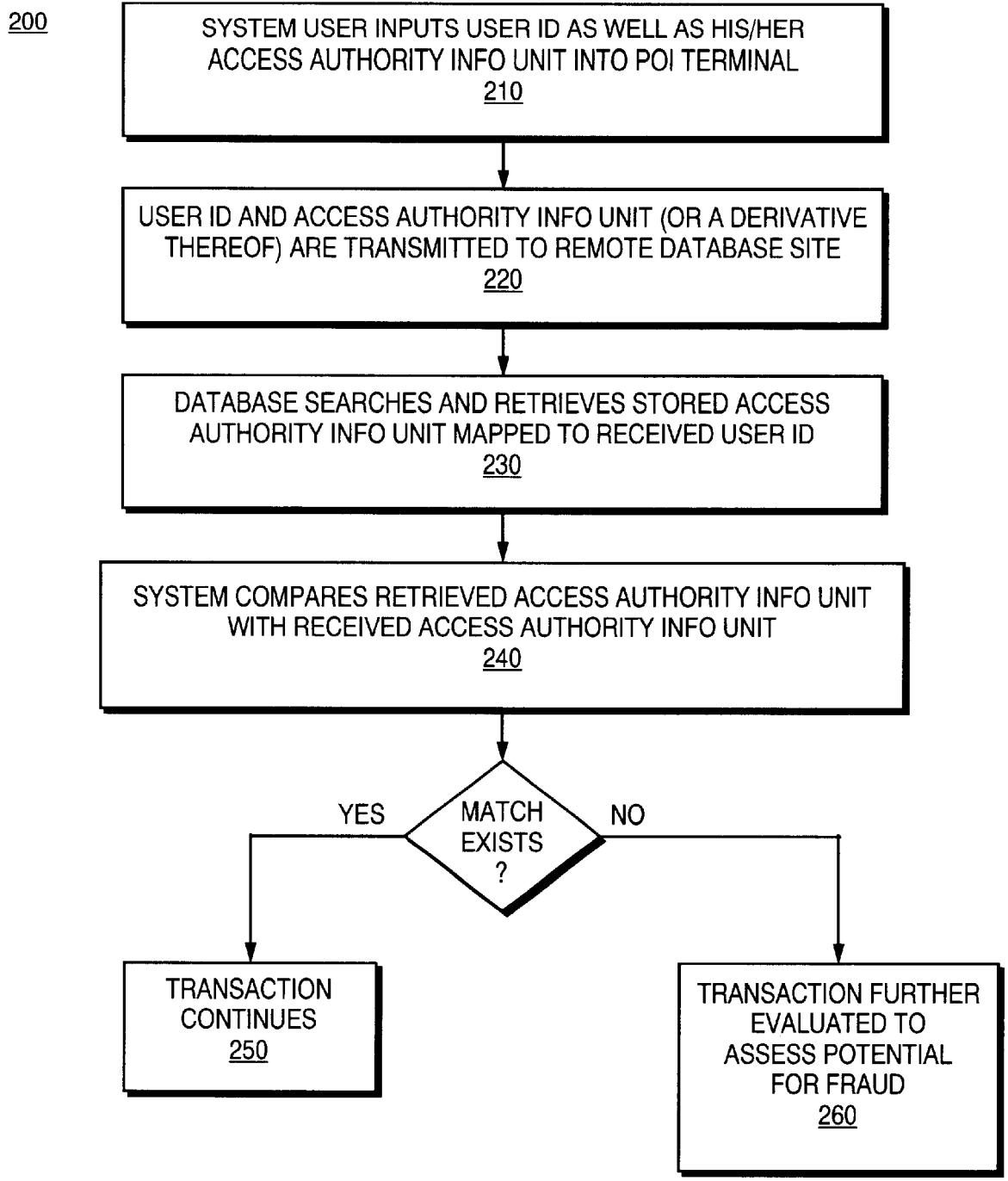
FIG. 6 is a block diagram showing a method for using biometric access authority information units to authenticate system users according to the present invention.

Once system users are enrolled as authorized system users, subsequent system user authentications 200 will be performed as indicated in FIG. 6. When an identification transaction is to be performed, such as when a store clerk accepts a credit card as payment form for a purchase transaction, the store clerk (system user) must, in addition to inputting the credit card account number into the point of identification terminal, input his or her system user ID as well as his or her access authority information unit into the point of identification terminal, step 210. In one preferred embodiment, this step will require the clerk to place one or more of his or her fingers over a fingerprint scanner and allow the system to read his or her fingerprint(s) as the biometric access authority information unit. Alternatively, if the clerk has been assigned a secondary access authority information unit, then that unit will be input into the point of identification terminal.

In either case, either the clerk's fingerprint image, a derivative thereof or his or her secondary access authority information unit, along with his or her system user ID will be transmitted to the remote database site, step 220. The remote database site will then search an access authority information unit database and retrieve a stored access authority information unit mapped to the received system user ID, step 230. The system will then compare the access authority information unit retrieved from the database with the access authority information unit transmitted to the remote database site from the point of identification terminal, step 240. If a match exists, then the system will allow the transaction to continue, step 250. Otherwise, the transaction will be further evaluated to assess the potential that the transaction may be fraudulent, step 260.

As long as the point of identification terminal and system user are authenticated, the point of identification terminal will be allowed to transmit an information request to the database storage site. The information request is also received by input/output controller 14, over a high speed network 15. The high speed network may be fiber distributed data interface (FDDI), asynchronous transfer mode (ATM) or any other suitable cost effective high speed network. The information request is then routed to one of a number of database servers 16–17 where the credit card account data is processed. The selected server then accesses a set of high speed, high reliability disk arrays 19–22 and retrieves the digital photographic, other image or other unique personal data associated with the account data received by the database server.

In addition to retrieving the digital image or other unique personal data stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approval credit limit. An alternate embodiment would be to have the remote database storage and retrieval site(s) co-located at a one or more CAA sites. In a law enforcement scenario, the database site may be linked to law enforcement databases for drivers and/or criminal records.

The identifier, which would be the sales clerk in a retail establishment, would only need to input the credit card information into one device and would receive both credit approval and identification information from a single source. In this scenario, input/output controller 13 would initiate a credit authorization request to and outside CAA 23 through modem bank 14 over public access telephone lines 12 or through a WAN connection 14' or the like. If the amount of the transaction is approved by the CAA 23, the database site would receive the credit approval code from the CAA and retransmit the code to the point of verification terminal along with the digital image information or other unique data over its established communications link. The credit approval code would be displayed either on the display means 6 of the point of verification terminal or, in the alternative, on an optional second display means 6'.

The point of identification terminal would then receive the information via modem WAN or wireless connection 8 and route it to controller 7, which would process the information received and display the digital image received on display means 6. In one embodiment of the invention, the digital information would be stored at the remote database storage site in a compressed state and would be transmitted to the point of identification terminal in the compressed state so as to minimize the time associated with a particular transaction. In this embodiment, the controller 7 would first decompress the digital photographic information and then display the information on display means 6.

Another embodiment of the invention, which would be used for situations where the highest security of information would be required, such as when a wireless, mobile identity verification terminal accesses the remote database site over cellular telephone links, the digital image information would be encrypted in addition to being compressed for transmission to the point of verification terminal. In this embodiment, the terminal controller 7 would be required to decrypt as well as decompress the photographic information in order to allow the information to be displayed on the display means.

Once the identification information is displayed at the point of identification terminal, the store clerk, or other person responsible for identity verification, would visually compare the image displayed on the display means with the physical appearance or the signature of the person presenting the credit card at the point of verification. If a match exists, then the clerk would input a specified key or keystroke sequence on input keypad 5 to indicate that the clerk in fact verified that an identity match exists.

For each identification transaction, a transaction record will be created and stored. Each transaction record will include information regarding the identity of the person who was identified by the transaction as well as identifying information for the system user who verified the person's identity. In addition, for purchasing transactions, financial information about the transaction may also be included in the transaction record.

Thus, if there is ever a question as to the veracity of the identification process, the system can recreate a transaction and identify not only the person initiating the transaction but the clerk who was responsible for positively identifying the individual initiated the transaction.

In addition, the system could be configured to incorporate an off-line fraud detection routine to monitor transaction patterns in order to identify out of norm fraud patterns. An example of such a routine would be for the system to note the time differential between transactions authorized by a specific system user and decide if it would be unlikely for that system user to have physically moved between the different point of identification terminals in order to have authorized the transactions. For instance, if the system user ID were forwarded to the remote database site from different point of identification terminals at different locations at nearly the same time, the system could highlight the transactions as being potentially fraudulent and thus requiring additional investigation.

In another embodiment of the basic invention, a retrofit terminal is used to add positive identification capabilities to existing point of sale devices and systems. The retrofit terminal is designed to work in conjunction with existing point of sale devices without the necessity of replacing currently existing retail establishment hardware systems.

The retrofit terminal is added at the existing point of sale and consists of a modified controller, a display means, a biometric input device, a secondary access authority information unit input device, and a communications interface. Preferably, the display means is a miniature flat panel display, similar to the type used in the point of identification terminal described above. The display can be located on available counter space or, if space is at a premium, it can be mounted on a pedestal or the like.

As indicated above, the preferred biometric input device would be a fingerprint scanner. However, the retrofit terminal could include other devices capable of reading other biometrics, such as voiceprints, retinal scans, thermal images and the like. The secondary access authority information unit input device comprises an electronic key reader to read system user PINs, which are implemented in electronic keys. Alternatively, the secondary access authority information unit input device may be omitted and, in the case of a memorized PIN-based secondary access authority information unit, the unit may be input on a keypad included on point of sale equipment, which is subsequently transmitted to the point of identification retrofit terminal device via the communications interface.

The retrofit terminal would be connected to a standard power source and to the existing credit card authorization hardware via its internal serial or parallel communications interface. The retrofit terminal would require the use of a modified controller. Instead of accepting the credit card account information from either a magnetic strip reader, a barcode reader, or a manual input, as is the case with the standard point of verification terminal, the retrofit terminal would accept the credit card account information from the existing point-of-sale hardware via its communications interface. The retrofit terminal would then initiate communications to a remote database site in the same manner described earlier in order to transmit access authority information units and retrieve and display identifying data, such as digitized photographs of the authorized credit card users.

The retrofit terminal would then forward the system user ID as well as the system user access authority information unit to the remote database site for system user authentication and storage in transaction records as described above. The retrofit terminal could also include an optional check scanner or an optional bar code reader to allow flexibility of use with other forms of payment such as personal or company checks or the like.

Thus, the retrofit terminal would greatly reduce the cost per identification site, would simplify the installation of hardware at each identification site, and would increase the viability and acceptability of the novel positive identification system.

Multiple remote database storage and retrieval centers would be tied together via a global high speed network 24–26 (FIG. 4). Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. Alternative methods of developing the database are disclosed in U.S. Pat. No. 5,657,339, issued Aug. 12, 1997 and assigned to the assignee of this invention, which is incorporated herein by reference.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A system for providing access integrity and audit capabilities to a positive identification system comprising:

a point of identification terminal including a system user biometric access authority information unit scanner, an identifying information unit input device for accepting information presented by a person to be identified at a point of identification, and a photographic image display device for displaying digital photographic images of persons to be identified at said point of identification;

at least one remote database site having stored therein a system user biometric database comprising a plurality of system user biometric access authority information units, each said system user biometric access authority information unit associated with a single authorized system user, and a photographic image database comprising a plurality of digital photographic images of persons to be identified;

a communications link, linking said point of identification terminal to said at least one remote database site to allow information to be transmitted therebetween;

a system user biometric comparator for verifying that a scanned system user biometric access authority information unit matches at least one of said plurality of system user biometric access authority information units stored in said system user biometric database;

a system user selectable input indicating that said system user has compared the digital photographic images displayed on said photographic image display device with the physical appearance of said person being identified at said point of identification and that a match exists between at least one of said displayed digital photographic images and the appearance of said person being identified.

2. The system for providing access integrity and audit capabilities to a positive identification system as claimed in claim 1, further comprising a plurality of transaction records stored at at least one of said remote database sites, each said transaction record comprising information identifying said person being identified and information identifying said system user verifying the identity of said person being identified at said point of identification.

3. The system for providing access integrity and audit capabilities to a positive identification system as claimed in claim 2 further comprising a means for verifying that said point of identification terminal is authorized to access said remote database site.

4. The system for providing access integrity and audit capabilities to a positive identification system as claimed in claim 1 wherein said biometric access authority information units associated with said plurality of authorized system users comprise digital images of fingerprints of said system users and wherein said biometric scanner comprises a fingerprint scanner.

5. The system for providing access integrity and audit capabilities to a positive identification system as claimed in claim 1 further comprising a plurality of secondary access authority information units stored in a secondary access authority information unit database at said remote database site said secondary access authority information units corresponding to said plurality of authorized system users and wherein said point of identification terminal further comprises a means for accepting a secondary access authority information unit provided by a system user.

6. The system for providing access integrity and audit capabilities to a positive identification system as claimed in claim 5, wherein said secondary access authority information unit comprises a personal identification number (PIN) and wherein said means for accepting said PIN is a keypad.

7. The system for providing access integrity and audit capabilities to a positive identification system as claimed in claim 6, wherein said keypad is included in said positive identification terminal.

8. The system for providing access integrity and audit capabilities to a positive identification system as claimed in claim 6, wherein said keypad is included in a separate device located at said point of identification and wherein said separate device communicates said PIN to said point of identification terminal.

9. The system for providing access integrity and audit capabilities to a positive identification system as claimed in claim 5 wherein said secondary access authority information unit comprises an electronic key-based personal identification number.

10. The system for providing access integrity and audit capabilities to a positive identification system as claimed in claim 1, wherein said biometric access authority information unit comprises a digital image of a retina of an authorized system user and wherein said biometric scanner comprises a retinal scanner.

11. The system for providing access integrity and audit capabilities to a positive identification system as claimed in claim 1, wherein said biometric access authority information unit comprises a voiceprint of an authorized system user and wherein said biometric scanner comprises an audio input device.

12. The system for providing access integrity and audit capabilities to a positive identification system as claimed in claim 1, wherein said biometric access authority information unit comprises a derivative of said scanned biometric access authority information unit.

13. A method of providing system integrity and audit capabilities to a positive identification system including at least one point of identification terminal having a plurality of input devices, including a biometric scanner and an identification information unit input and at least one display device including a photographic image display device, and at least one remote database site including a system user biometric database and an identification database comprising identification information units for a plurality of persons to be identified and at least one digital photographic image of a person corresponding to each identification information unit, said method comprising the steps of:

registering a plurality of authorized system users by accepting and storing at least one system user biometric access authority information unit and identification information from each authorized system user in said system user biometric database;

logging a system user onto said positive identification system by scanning a system user biometric identifier into said at least one point of identification terminal;

establishing communications between said point of identification terminal and said at least one database site;

transmitting said scanned system user biometric identifier to said at least one remote database site and comparing, at said at least one remote database site, said transmitted biometric identifier with said biometric identifiers stored at said system user biometric database at said remote database site;

granting access to said system user if a match exists between said transmitted biometric identifier and a stored biometric identifier;

accepting an identification information unit from a person being identified at said point of identification terminal and inputting said identification information unit into said said point of identification terminal;

transmitting said input identification information unit to said at least one remote database site;

searching said database of digital photographic images of person to be identified, retrieving at least one digital photographic image associated with said identification information unit transmitted to said remote database site and transmitting said at least one retrieved digital photographic image to said point of identification terminal;

displaying said at least one digital photographic image on said photographic image display device at said point of identification terminal;

comparing said at least one displayed digital photographic image with a physical characteristic of said person being identified;

acknowledging the verification of the identity of the person being identified if a match exists between at least one displayed digital photographic image and said physical characteristic of said person being identified; and storing an indicator of the identity of the system user and an indicator of the identity of the person being identified in a transaction record.

14. The method of providing system integrity and audit capabilities to a positive identification system as claimed in claim 13, wherein said step of registering authorized system users comprises obtaining a digital image of at least one fingerprint of each said authorized system user as said biometric access authority information unit and wherein said step of inputting a biometric identifier comprises scanning at least one fingerprint of said system user.

15. The method of providing system integrity and audit capabilities to a positive identification system as claimed in claim 14, wherein said step of registering a plurality of authorized system users further comprises assigning a unique secondary access authority information unit to each authorized system user and storing said secondary access authority information units in a secondary access authority information unit database at said at least one remote database site.

16. The method of providing system integrity and audit capabilities to a positive identification system as claimed in claim 15 wherein:

said step of logging a system user onto said positive identification system further comprises inputting said secondary access authority information unit into said positive identification system;

said step of transmitting said biometric access authority information unit to said at least one remote database site further comprises transmitting said secondary access authority information unit to said at least one remote database site and comparing said transmitted secondary access authority information unit with said secondary access authority information units stored in said secondary access authority information unit database; and said step of granting access to said system user further comprises granting access if a match exists between said transmitted secondary access authority information unit and one of said stored secondary access authority information units.

17. A method of providing system integrity and audit capabilities to a positive identification system comprising the steps of:

registering a plurality of authorized system users by accepting a biometric identifier and identification information from each authorized system user;

logging a system user onto said positive identification system by inputting a biometric access authority information unit into said positive identification system;

establishing communications between a point of identification terminal and at least one database site, said database site including a database of biometric identifiers accepted from authorized system users and a plurality of biometric identifiers associated with persons to be identified, each of said plurality of biometric identifiers associated with at least one identification information unit identifying said persons to be identified;

transmitting said biometric access authority information unit input into said positive identification system to said at least one remote database site and comparing, at said at least one remote database site, said transmitted biometric access authority information unit with said biometric identifiers stored at said remote database site;

granting access to said system user if a match exists between said transmitted biometric access authority information unit and a biometric identifier stored at said remote database site;

accepting an identification information unit from a person being identified and inputting said identification information unit into said positive identification system;

transmitting said input identification information unit to said at least one remote database site;

searching said database of biometric identifiers of person to be identified and retrieving at least one biometric identifier associated with said identification information unit;

comparing said at least one retrieved biometric identifier with a physical characteristic of said person being identified;

acknowledging the verification of the identity of the person being identified if a match exists between said retrieved biometric identifier and said physical characteristic of said person being identified; and storing a pointer to at least said identification information for said system user and a pointer to said identification information unit accepted from said person being identified in a transaction record.

* * * * *